US007862893B2

(12) United States Patent
O'Rear et al.

(10) Patent No.: US 7,862,893 B2
(45) Date of Patent: Jan. 4, 2011

(54) PARAFFINIC WAX PARTICLE COATED WITH A POWDER COATING

(75) Inventors: Dennis J. O'Rear, Penngrove, CA (US); Gunther H. Dieckmann, Walnut Creek, CA (US)

(73) Assignee: Chevron U.S.A., Inc., San Ramon, CA (US)

( * ) Notice: Subject to any disclaimer, the term of this patent is extended or adjusted under 35 U.S.C. 154(b) by 18 days.

(21) Appl. No.: 12/333,004

(22) Filed: Dec. 11, 2008

(65) Prior Publication Data

US 2009/0084028 A1 Apr. 2, 2009

Related U.S. Application Data

(63) Continuation of application No. 12/030,673, filed on Feb. 13, 2008, now Pat. No. 7,754,065, and a continuation of application No. 12/030,688, filed on Feb. 13, 2008, now Pat. No. 7,754,066.

(51) Int. Cl.
*B32B 5/16* (2006.01)
*C10G 49/18* (2006.01)
*C10G 73/40* (2006.01)

(52) U.S. Cl. .......................... 428/403; 208/20; 208/24; 208/107; 428/407

(58) Field of Classification Search ................. 428/403, 428/407; 204/20, 24, 107
See application file for complete search history.

(56) References Cited

U.S. PATENT DOCUMENTS

| | | | | |
|---|---|---|---|---|
| 2,817,693 | A * | 12/1957 | Koome et al. | 208/46 |
| 3,620,963 | A * | 11/1971 | Mulaskey | 208/111.1 |
| 3,645,941 | A | 2/1972 | Snapp et al. | |
| 4,766,166 | A | 8/1988 | Upadhyaya et al. | |
| 4,943,672 | A * | 7/1990 | Hamner et al. | 585/737 |
| 6,284,806 | B1 | 9/2001 | Chakrabarty et al. | |
| 6,296,757 | B1 * | 10/2001 | Wittenbrink et al. | 208/15 |
| 6,359,018 | B1 * | 3/2002 | O'Rear et al. | 518/700 |
| 6,776,898 | B1 * | 8/2004 | Wittenbrink et al. | 208/89 |
| 6,822,131 | B1 * | 11/2004 | Berlowitz et al. | 585/733 |
| 7,282,134 | B2 * | 10/2007 | Abernathy et al. | 208/18 |
| 7,479,216 | B2 * | 1/2009 | Dieckmann et al. | 208/18 |
| 7,501,019 | B2 * | 3/2009 | Dieckmann et al. | 106/502 |
| 7,754,065 | B2 * | 7/2010 | Dieckmann et al. | 208/24 |
| 7,754,066 | B2 * | 7/2010 | Dieckmann et al. | 208/24 |
| 2006/0016724 | A1 | 1/2006 | Miller et al. | |
| 2006/0065573 | A1 | 3/2006 | Dieckmann et al. | |
| 2006/0069295 | A1 | 3/2006 | Dieckmann et al. | |
| 2006/0069296 | A1 | 3/2006 | Dieckmann et al. | |
| 2007/0243381 | A1 * | 10/2007 | O'Rear et al. | 428/403 |

FOREIGN PATENT DOCUMENTS

| | | |
|---|---|---|
| DE | 1620782 | 3/1966 |
| FR | 1513971 | 2/1968 |
| JP | 2005105323 | 4/2005 |

OTHER PUBLICATIONS

Translation of FR-1.513.971, Photoprotective Flowable Waxes, (1968).*

* cited by examiner

*Primary Examiner*—H. (Holly) T Le
(74) *Attorney, Agent, or Firm*—Susan M. Abernathy

(57) ABSTRACT

A granular solid wax particle, comprising a) a highly paraffinic wax having a T10 boiling point less than 427° C. and comprising at least 40 weight percent n-paraffins, and b) an inorganic powder coating on the wax particle. Also, a process for making a fuel or a base oil, comprising transporting the granular solid wax particles in a transport vessel to a distant location where the granular solid wax particles are processed into the fuel or the base oil.

19 Claims, No Drawings

PARAFFINIC WAX PARTICLE COATED WITH A POWDER COATING

This application is a continuation of U.S. patent application Ser. Nos. 12/030,673 and 12/030,688, now U.S. Pat. Nos. 7,754,065 and 7,754,066, respectively, filed on Feb. 13, 2008; both of which claim the benefit of U.S. patent application Ser. No. 11/097,073, filed on Mar. 31, 2005.

FIELD OF THE INVENTION

The present invention relates to a composition of a granular solid wax particle coated with a powder, and a process for making a fuel or a base oil from the transported solid wax particles.

BACKGROUND OF THE INVENTION

Highly paraffinic wax is made by a number of different refining processes. It may be further upgraded into other desirable hydrocarbon products, such as fuels, lubricants, and chemicals. As wax upgrading equipment is expensive to manufacture, and there are wax upgrading plants which are under utilized at a number of currently existing refineries, it is often desired to produce wax at one location and ship the wax to a distant location for further upgrading. The problem is that the wax is difficult to handle, especially in large quantities.

Others have shipped wax by melting it and transporting it in a molten form, selecting a high boiling cut of the wax and making hard solid pellets, making solid wax pellets and suspending them in other hydrocarbon liquids, and forming an emulsion of the wax in water. A number of these earlier shipping methods are described in U.S. patent application Ser. No. 10/950,662, filed Sep. 28, 2004. In some situations, the shipping of granular solids can be preferred over the shipping of molten wax or slurries. One situation is when the receiving site already has facilities for handling granular solids.

Others have also shipped wax as solid particles; however these waxes had boiling points well above 800° F. such that the waxes were hard and could resist crushing. When a high boiling cut is selected, there is a wasteful loss of the upgradable lower boiling wax. Typically these solid wax particles have been shipped in boxes or bags on pallets, where the pallets have only been loaded to about 2000 lbs per pallet. The majority of the earlier solid wax particles had low needle penetration at 25° C. Either their needle penetrations were less than 2 mm/10 at 25° C., or they were restricted to shipping in small containers so they would not break or clump together under their weight.

What is desired is a granular solid wax particle with a lower boiling cut, or having a high needle penetration by ASTM D1321, that can be shipped in bulk in the hold of a large transport vessel without clumping together or breaking. It is especially desired that vessels with large holds, such as crude oil tankers, be utilized for shipping the granular solid wax particles.

SUMMARY OF THE INVENTION

We provide a granular solid wax particle, comprising: a) a highly paraffinic wax having a T10 boiling point less than 427° C. (800° F.) and comprising at least 40 weight percent n-paraffins; and b) an inorganic powder coating on the wax particle.

We also provide a process for making a fuel or a base oil, comprising transporting the granular solid wax particles in a transport vessel to a distant location where the granular solid wax particles are processed into the fuel or the base oil.

DETAILED DESCRIPTION

Although the shipping of granular solid particles may be relatively expensive compared to shipping liquid hydrocarbons, many common products are shipped this way. Examples of products that are economically shipped as granular solid particles are grains, hydroprocessing catalysts, coal, and granulated detergents. As long as the solid particles do not break or clump together, they may be easily transported as granular solids using a wide variety of processes.

Sasol, Shell, and other wax producers, currently market granular solid wax pellets, flakes, grains, or pastilles. They are generally sold and transported in small packages to prevent the weight of the product from breaking or causing the solid particles to clump together. In addition, up until this invention the marketed granular solid wax particles have had T10 boiling points greater than 800° F. Some examples of highly paraffinic Fischer-Tropsch derived granular solid wax particles are shown below.

| Wax Properties | Paraflint ® C80 | Paraflint ® C105 | Paraflint ® H1 | Paraflint ® H5 | SARAWAX ™ 100 |
|---|---|---|---|---|---|
| D6352 SIMDIST TBP (WT %), ° F. | | | | | |
| T10 | 873 | 1087 | 994 | 1027 | Not tested |
| T90 | 1062 | 1324 | 1321 | 1339 | Not tested |
| Needle Penetration, mm/10, ASTM D1321 | | | | | |
| 25° C. | 6 | 1 | 1 | 1 | 1 |
| 65° C. | 66 | 9 | 23 | 6 | 12 |

SARAWAX ™ is a Shell trademark. Paraflint ® is a registered SASOL trademark.

Granular solid wax particles, in the context of this disclosure, are free flowing solids. "Free flowing" means: is capable of being in a flowing or running consistency. Examples of other free flowing solids include grains, hydroprocessing catalysts, coal, and granulated detergents. The granular solid wax particles of this invention have a particle size greater than 0.1 mm in the longest direction. Preferably they are of a particle size between 0.3 and 50 mm in diameter in the longest direction, and more preferably of a particle size between 1 and 30 mm in diameter in the longest direction. The granular solid wax particles most useful in this invention have a shape that is selected from one of the following: pastille, tablet, ellipsoid, cylinder, spheroid, egg-shaped, and essentially spheroid. By essentially spheroid we mean that the particle has a generally rounded shape with an aspect ratio of less than about 1.3. As used herein, "aspect ratio" is a geometric term defined by the value of the maximum projection of a particle divided by the value of the width of the particle. The "maximum projection" is the maximum possible particle projection. This is sometimes called the maximum caliper dimension and is the largest dimension in the maximum cross-section of the particle. The "width" of a particle is the particle projection perpendicular to the maximum projection and is the largest dimension of the particle perpendicular to the maximum projection. If the aspect ratio is being determined on a collection of particles, the aspect ratio may be measured on a few representative particles and the results averaged. Representative particles should be sampled by ASTM D5680-95a (Reapproved 2001). The wax may be formed into solid particles by a number of processes, including: molding, prilling, rolling, pressing, tumble agglomeration, extrusion, hydroforming, and rotoforming. Sandvik Process Systems (Shanghai), for example, has developed large rotoforming equipment for producing free flowing pastilles of paraffin wax that would be useful in this invention.

Highly paraffinic wax, in the context of this disclosure, is wax having a high content of normal paraffins (n-paraffins). A highly paraffinic wax useful in the practice of the process scheme of the invention will generally comprise at least 40 weight percent n-paraffins, preferably greater than 50 weight percent n-paraffins, and more preferably greater than 75 weight percent n-paraffins. The weight percent n-paraffins is typically determined by gas chromatography, such as described in detail in U.S. patent application Ser. No. 10/897,906, filed Jul. 22, 2004.

Examples of highly paraffinic waxes that may be used in the present invention include slack waxes, deoiled slack waxes, refined foots oils, waxy lubricant raffinates, n-paraffin waxes, NAO waxes, waxes produced in chemical plant processes, deoiled petroleum derived waxes, microcrystalline waxes, Fischer-Tropsch derived waxes, and mixtures thereof. The pour points of the highly paraffinic waxes used in the practice of this invention are generally greater than about 50° C. and usually greater than about 60° C. The term "Fischer-Tropsch derived" means that the product, fraction, or feed originates, from or is produced at some stage by a Fischer-Tropsch process. The feedstock for the Fischer-Tropsch process may come from a wide variety of hydrocarbonaceous resources, including natural gas, coal, shale oil, petroleum, municipal waste, derivatives of these, and combinations thereof.

The highly paraffinic wax which is useful in the composition of the granular solid wax particle of this invention has a low T10 boiling point. Prior to this invention, granular solid waxes with such a low T10 boiling point would be too soft, and they would clump together under pressure during bulk transport. In preferred embodiments, the granular solid wax particle of this invention also has a broad boiling point. A broad boiling point granular solid wax particle is desired, for example, because the broader the boiling point the more crush resistant the granular solid wax particle will be, and the broader range of finished products that may be produced from it, preferably including one or more grades of base oils. All boiling range distributions and boiling points in this disclosure are measured using the simulated distillation total boiling point (SIMDIST TBP) standard analytical method ASTM D6352 or its equivalent unless stated otherwise. As used herein, an equivalent analytical method to ASTM D6352 refers to any analytical method which gives substantially the same results as the standard method. The T10 boiling point is the temperature at which 10 weight percent of the wax boils. The T90 boiling point is the temperature at which 90 weight percent of the wax boils. A highly paraffinic wax suitable for use in the invention has a T10 boiling point less than 427° C. (800° F.). Preferably the highly paraffinic wax has a T10 boiling point less than 343° C. (650° F.). Additionally, the highly paraffinic wax suitable for use in the invention will preferably have a T90 boiling point greater than 538° C. (1000° F.). Preferably the final boiling point of the highly paraffinic wax will be greater than about 620° C. (about 1150° F.). Less than about 10 weight percent of the highly paraffinic wax will preferably boil below about 260° C. (about 500° F.). Due to the broad boiling range of the highly paraffinic wax the difference between the T10 boiling point and the T90 boiling point will preferably be greater than about 275° C. (about 500° F.).

In another embodiment the highly paraffinic wax which is useful in the composition of the granular solid wax particle of this invention has a high needle penetration at 25° C. Needle penetration is determined by ASTM D1321-04. The needle penetration is greater than 3 mm/10 at 25° C., preferably greater than 5. Prior to this invention, waxes with a needle penetration this high were too soft to ship in large transport containers without clumping together.

The granular solid wax particles of this invention comprise the highly paraffinic waxes described above and an inorganic powder coating. Inorganic powder compounds useful in this invention must be solid at room temperature, non-hydroscopic and be able to be reduced to a fine micron or submicron sized powder via conventional particle production technology. Useful inorganic powder compounds include but are not limited to the oxides, hydroxides, carbonates, phosphates, silicates, and combinations thereof of Group 1, 2, 3, 4, 5, 6, 7, 8, 9, 10, 11, 12, 13, and/or 14 elements of the Periodic Table (IUPAC 1997). More preferred inorganic compounds that are useful in this art should be readily available and at low cost. They include but are not limited to alumina, aluminum phosphate, magnesium oxide, calcium carbonate, calcium hydroxide, calcium oxide, iron oxide, silica, silicates, and various clays and minerals, such as kaolin, attapulgite, spiolite, talc, feldspars, olivines, dolomite, apatites, etc. While cost and availability of the powder coating is important, the most preferred compounds useful in this art are those powdered substances that adsorb the wax without being encapsulated by the wax in a hot drop wax test.

We have discovered a simple test, referred to herein as the "hot drop wax test," in which a hot molten droplet of the wax (from an eye dropper) at 80° C. is dropped onto a flattened pile of powder heated to the same temperature as the wax. With the most useful powders, the wax will immediately be adsorbed by the powder, the resulting powder coating will not appear to be wet, and upon cooling, the wax impregnated powder can be easily spread out and dispersed by for example rolling the wax impregnated powder between one's fingers.

With a less preferred powder, the molten wax droplet may linger on the surface for a few seconds, and then slowly penetrate the powder to produce a region that looks noticeably wet. Upon cooling a wax impregnated less preferred powder, the adsorbed wax will form a "button" with the powder indicating that the wax has encapsulated the less preferred powder. Some most useful powders that adsorb the wax without being encapsulated by the wax in a hot drop wax test include but are not limited to gamma alumina, alpha alumina, titanium oxide, and mixtures thereof. Adsorption occurs when one substance is being held inside another by physical bonds, rather than becoming chemically integrated into another (which is absorption).

The particle size of the powder will always be substantially smaller than the size of the highly paraffinic wax particles they are applied to. Thus the particle size of the powder coating should be less than 100 microns in diameter and more preferably less than 10 microns in diameter. Particle size and surface contaminants will influence the hot wax drop test. Thus it is important the powder coating material be ground to a size that performs acceptably in the hot drop wax test.

The amount of powder as a percentage of the total wax particle will clearly depend upon the surface to volume ratio of the wax particle and the sticking coefficient of the powder coating to the wax particle. However due to cost and handling issues, it is desirable that the powder coating account for less than eight weight percent by weight of the total coated wax particle. More preferably, the powder will weigh between 0.1 and 5 weight percent, and even more preferably will weigh between 0.1 and 3 weight percent or 0.5 and 3 weight percent of the total coated wax particle to insure that there is an adequate amount of the powder on the surface of the wax particle to prevent the particles from sticking or clumping together during transport.

Powder coatings are dry coatings that can be applied to the outer surface of the solid wax particles without the need for a solvent or volatile carrier. Examples of equipment that may be used to apply the powder coating are spray guns, tumbling drum mixers, and vibratory conveyors.

The likelihood of breakage or clumping is more pronounced the higher the height of wax in the hold of the transport vessel. The granular solid wax particles of this invention will not clump together or break under heavy loads. Typically they will withstand loads of greater than 450 g/cm2, more preferably greater than 600 g/cm2, and even more preferably greater than 650 g/cm2. A load of 690 g/cm2 is equivalent to the force of approximately 12 meters of solid wax particles pressing down from above. The granular solid wax particles of this invention may be transported in a transport vessel to a distant location when they are loaded in the transport vessel to a height of greater than 7.5 meters, preferably to a height greater than 12 meters.

An embodiment of the granular solid wax particle of this invention has a layer of harder wax between the highly paraffinic wax having a T10 boiling point less than 427° C. (800° F.) and the powder coating. This harder wax has a T10 boiling point greater than 510° C. (950° F.), such that it gives even greater crush resistance to the particle. The layer of harder wax can be applied by dipping, misting, spraying, standard panning, or other coating methods.

The granular solid wax particles may be loaded into a transport vessel using a wide variety of bulk solids handling equipment, including belt conveyors, screw conveyors, pneumatic conveyors, tubing, scoop loaders, blowers, vacuum-pressure loading systems, and hopper loaders. Due to dust created in handling and transporting the wax particles, it may be necessary to install either on shore or on the vessel one or more methods of trapping fine air borne particles, such as air filters, cyclones, electrostatic precipitators or any other method known in the art. Because the granular solid wax particles of this invention are less likely to crush and stick together, they may be handled relatively easily by conventional equipment. They are preferably loaded to a height greater than 7.5 meters, for example greater than 12 meters; such that large quantities may be transported in bulk in the hold of a large transport vessel. A preferred transport vessel is a crude oil tanker.

In preferred embodiments, the loaded transport vessel carrying the granular solid wax particles is transported to a distant location where the granular solid wax particles are unloaded for further processing. Similar processes used to load the transport vessel may be used to unload the granular solid wax particles from the transport vessel. Again due to attrition of the powder coating it may be necessary to make provisions for trapping dust such as particle filters, cyclones, electrostatic precipitators, and the like. Alternatively, a slurry of the granular solid wax particles could be made on the vessel just before unloading, such that the wax could be pumped off the vessel as a liquid slurry. Slurry processes that would be suitable to use are described in U.S. patent application Ser. Nos. 10/950,653, 10/950,654, and 10/950,662, filed on Sep. 28, 2004, and incorporated herein. Liquids useful for the creation of the liquid/wax slurry include water, alcohol, light-distillates, mid-grade distillates, vacuum gas oil, and/or other refinery streams or combinations thereof. Low sulfur liquids are preferred in applications where sulfur contamination of the wax is an issue. Alternatively, in some refineries where the resulting product could be sent to a conventional hydrocracker or lubricant hydrocracker, a liquid hydrocarbon feed such as a vacuum gas oil could be pumped into the transport vessel's hold, to allow for removal of the wax from the transport vessel as a slurry.

In one embodiment, one might use a pneumatic system to offload the solid wax particles from a transport vessel. A cyclone would be used to recover the wax, and the wax would be placed into an oil phase for further processing. The conditions of the cyclone would be set such that at least a portion of the powder is separated from the solid wax particles. The powder could be captured from the air in a conventional air filtration system (bag house), possibly with electrostatic precipitators. Optionally, at least a portion of the recovered powder can be returned to the granular solid wax particle production site.

In the context of this invention a distant location is a site at least 10 miles away, preferably it is a site at least 100 miles away. The distant location may be a refinery, or more specifically a base oil production plant. Further processing may include melting, removal of the powder coating from the granular solid wax particles, vacuum distilling, hydroprocessing, solvent dewaxing, clay treating, and blending.

Removal of the powder coating, which may interfere with subsequent processing of the wax, may be achieved by one or more of the following: attrition, air blowing, water washing, acid washing or more preferably by melting the wax. With melting of the wax, the more dense powder coating will in most cases simply settle to the bottom of a tank or vessel where it can be collected and sold or simply reprocessed and returned to the granular solid wax particle production site. For very fine powder coatings it may be necessary to add a clarifying agent or additive, or use a hydrocyclone to separate the inorganic component from the molten wax. Alternatively, the molten wax could be purified by filtration or distillation.

An especially preferred further processing option, and one for which the low boiling highly paraffinic wax has superior properties for, is hydroprocessing of the granular solid wax particles to produce one or more base oils. Hydroprocessing options include hydrotreating, hydrocracking, hydroisomerization, and hydrofinishing. Lighter products, such as diesel and naphtha, may also be produced as side products by the hydroprocessing of the low boiling highly paraffinic wax. Examples of hydroprocessing steps that would be suitable for use with the low boiling highly paraffinic wax are described in U.S. patent application Ser. No. 10/744,870, filed Dec. 23, 2003, and completely incorporated herein.

In one embodiment it is possible that the powder may be removed after the hydroprocessing of the wax if the hydroprocessing is done under upflow hydroprocessing conditions. Preferred processes for upflow hydroprocessing of wax are described in U.S. Pat. No. 6,359,018, and incorporated herein.

Examples of processes that may be used to remove the powder from the hydroprocessing product liquids are filtration, distillation, centrifugation, and combinations thereof. In some situations, removing the powder from the hydroprocessing product liquids may be easier than removing them from the granular solid wax particles prior to hydroprocessing.

The following examples will serve to further illustrate the invention but are not intended to be a limitation on the scope of the invention.

EXAMPLES

Example 1

A sample of Fischer-Tropsch wax made using a Co-based Fischer-Tropsch catalyst was analyzed and found to have the properties as shown in Table I.

TABLE I

| Fischer-Tropsch Wax | |
|---|---|
| Wax Properties | |
| Nitrogen, ppm | 7.6 |
| D6352 SIMDIST TBP (WT %), ° F. | |
| T0.5 | 427 |
| T5 | 573 |
| T10 | 625 |
| T20 | 692 |
| T30 | 736 |
| T40 | 789 |
| T50 | 825 |
| T60 | 874 |
| T70 | 926 |
| T80 | 986 |
| T90 | 1061 |
| T95 | 1124 |
| T99 | 1221 |
| Needle Penetration, mm/10, ASTM D1321 | |
| 25° C. | 5.1 |
| 43° C. | 15.8 |
| 65° C. | 55.2 |

Example 2

The wax described in Example 1 was formed into substantially spherical particles of about 10 mm diameter by molding molten wax in a brass die. 15 grams of the wax particles were placed in a single layer in a 2" diameter brass/bronze pellet press. A load of 690 g/cm2 was applied to the wax particles by slowly and evenly placing a large weight on the plunger of the pellet press. A load of 690 g/cm2 is equivalent to the force of approximately 12 meters (40 ft) of solid wax particles pressing down from above, assuming a wax density of 0.936 g/cm3 with a 40% void fraction. The particles were stored under the load at a temperature of 20° C. After one week, the load was removed, and the plunger on the pellet press was carefully and slowly moved to push out the wax particles. It was observed that the uncoated wax particles stuck together into a single solid mass. When the compressed wax clump was placed in a Petri dish and then tilted the wax still clung together as one big lump. This demonstrated that the uncoated wax could not be shipped in the hold of a large transport vessel, since at the end of the journey it would be very difficult and/or expensive to remove the wax from the hold.

Example 3

The 10 mm diameter wax particles described in Example 2 were coated by shaking the particles in a plastic bag with one of the following powders: 1.8 wt % titanium dioxide (JT Baker), 0.7 wt % gamma alumina (0.05 micron from Buehler), 2.8 wt % calcium carbonate (JT Baker), 1.0 wt % white wheat flour (Gold Medal), 1.0 wt % powdered sugar (C&H), or 0.1 wt % activated carbon (Darco KB-B, Aldrich). Thus 15 grams of coated particles of each type were individually placed into the 2" diameter bronze/brass pellet press and a load of 690 g/cm2 was applied to the coated wax particles for 1 week at a temperature of 20° C. The applied load was removed and the wax particles were then carefully ejected from the pellet press. The coated wax particles were then placed in a Petri dish, which was then tipped approximately 30 degrees to observe how the particles flowed. The observations from examples 2 and 3 are summarized in Table II, below:

TABLE II

Observations of Coated Wax Particles after 1 Week

| Coating | Concentration | Observation | Effectiveness |
|---|---|---|---|
| Titanium dioxide | 1.8 wt % | all particles flowed freely, no clumps | excellent |
| Gamma alumina | 0.7 wt % | only two particles stuck together | excellent-good |
| Calcium carbonate | 2.8 wt % | some particle clumping | fair-good |
| White flour | 1.0 wt % | some particle clumping | fair-good |
| Powdered sugar | 1.0 wt % | extensive particle clumping | fair |
| Activated carbon | 0.1 wt % | extensive particle clumping | poor-fair |
| No coating | 0 wt % | one single clump | complete failure |

The titanium dioxide and gamma alumina powder coatings completely prevented the wax particles from clumping together under the applied load. The coating of calcium carbonate was less effective but possibly could work if the load was smaller. The activated carbon coating was the least effective of the coatings. However, it is clear that even a poor powder coating is better than no coating at all.

Example 4

To distinguish between highly effective powder coating materials from those that are less effective, we have discovered that by observing how a drop of hot molten wax interacts with the test powder heated to the same temperature, it is possible to predict the performance of the powder coating in the pressure test used in examples 2 and 3. Thus one drop of the Fischer-Tropsch wax from example 1 (FT wax), heated to 80° C., was placed on approximately 3 grams of the test powder flattened with a spatula and also heated to 80° C. The wax and test powder where then cooled to 20° C. Observations were taken at 80° C. and after cooling to 20° C. The observations are summarized in Table III below:

TABLE III

Observations of Hot Wax Drop Test

| Coating | Observation at 80° C. | at 20° C. |
|---|---|---|
| Titanium dioxide | instantly adsorbed | the wax impregnated powder easily breaks apart between one's fingers - no encapsulation |
| Gamma alumina | instantly adsorbed | the wax impregnated powder easily breaks apart between one's fingers - no encapsulation |
| Calcium carbonate | FT wax droplet stays on the surface for a few seconds | wax has encapsulated the powder to form a "button" |
| Activated carbon | FT wax droplet stays on the surface for a few seconds | wax has encapsulated the powder to form a "button" |

These results demonstrate that certain powder coatings such as titanium dioxide interact very differently with the Fischer-Tropsch wax so that it does not become encapsulated by the wax, and thus does not form a solid "button."

Clearly when two wax particles that are composed of highly paraffinic wax with a T10 boiling point less than 800° F. are subject to pressures equivalent to 12 meters of wax the contact point surface will deform. The powder coatings help block the interdiffusion of wax from one particle to the next. Thus the particles can be easily separated. Powders that can be encapsulated by the wax are not as effective as those that seem to be readily adsorbed by the wax. Wax impregnated titanium dioxide powder flows and breaks apart almost the same as the pure starting material. This is not the case for the other powders that we tested, such as calcium carbonate and activated carbon, which at room temperature had formed a "button."

These results demonstrate that solid wax particles comprising a highly paraffinic wax with a T10 boiling point less than 800° F. coated with a powder, such as titanium dioxide powder, would be ideal for shipping over long distances in the hold of a large transport vessel, such as a crude oil tanker.

We claim:

1. A granular solid wax particle, comprising:

a. a highly paraffinic wax having a T10 boiling point less than 427° C. (800° F.) and comprising at least 40 weight percent n-paraffins; and b. an inorganic powder coating on the wax particle; wherein the inorganic powder is selected from the group of gamma alumina, alpha alumina, titanium oxide, and mixtures thereof.

2. A granular solid wax particle, comprising:

a. a highly paraffinic wax having a T10 boiling point less than 427° C. (800° F.) and comprising at least 40 weight percent n-paraffins;

b. a layer of a second highly paraffinic wax having a T10 boiling point greater than 510° C. (950° F.) placed over the highly paraffinic wax; and c. an inorganic powder coating on the wax particle.

3. The granular solid wax particle of claim 2, wherein the inorganic powder is selected from the group of oxide, hydroxide, carbonate, phosphate, silicate, and combinations thereof.

4. The granular solid wax particle of claim 1 or claim 2, wherein the granular solid wax particle size is between 0.3 to 50 mm in the longest direction.

5. The granular solid wax particle of claim 1 or claim 2, wherein the highly paraffinic wax comprises greater than 50 weight percent n-paraffins.

6. The granular solid wax particle of claim 1 or claim 2, wherein the highly paraffinic wax comprises greater than 75 weight percent n-paraffins.

7. The granular solid wax particle of claim 1 or claim 2, wherein the highly paraffinic wax is Fischer-Tropsch derived.

8. The granular solid wax particle of claim 1 or claim 2, wherein the coating adsorbs the wax without being encapsulated by the wax in a hot drop wax test.

9. The granular solid wax particle of claim 1 or claim 2, wherein the inorganic powder is selected from the group of gamma alumina, titanium oxide, and mixtures thereof.

10. The granular solid wax particle of claim 1 or claim 2, wherein:

a. the wax has a needle penetration by ASTM D1321 greater than 3 mm/10 at 25° C.; and b. the coating adsorbs the wax without being encapsulated by the wax in a hot drop wax test.

11. A process for making a fuel or a base oil, comprising transporting the granular solid wax particles of claim 1 or claim 2 in a transport vessel to a distant location where the granular solid wax particles are processed by one or more hydroprocessing steps selected from the group of hydrotreating, hydrocracking, hydroisomerization, and hydrofinishing into the fuel or the base oil.

12. The process of claim 11, wherein the highly paraffinic wax is Fischer-Tropsch derived wax.

13. The process of claim 11, wherein a height of the granular solid wax particles in the transport vessel is greater than 7.5 meters.

14. The process of claim 11, wherein the height is greater than 12 meters.

15. The process of claim 11, wherein the highly paraffinic wax has a needle penetration by ASTM D1321 greater than 3 mm/10 at 25° C.

16. The process of claim 11, wherein the granular solid wax particles are processed using a hydroprocessing step.

17. The process of claim 11, wherein the powder of the powder coating adsorbs the wax without being encapsulated by the wax in a hot drop wax test.

18. The process of claim 16, additionally comprising removing the powder coating from the granular solid wax particles prior to the hydroprocessing step.

19. The process of claim 11, additionally comprising forming a slurry of the granular solid wax particles to unload the granular solid wax particles from the transport vessel.

* * * * *